United States Patent [19]
Wright

[11] 3,803,613
[45] Apr. 9, 1974

[54] PHASE ANTENNA ARRAY PROVIDING CONTINUOUS ALL-ANGLE RECEPTION BY HARMONIC FREQUENCY MODULATION OF INCOMING SIGNALS

[75] Inventor: Maynard Lattimer Wright, San Jose, Calif.

[73] Assignee: The United States of America as represented by the Secretary of the Navy, Washington, D.C.

[22] Filed: Oct. 26, 1971

[21] Appl. No.: 192,409

[52] U.S. Cl. ........ 343/113 R, 343/100 SA, 343/854
[51] Int. Cl. .............................................. H01q 3/26
[58] Field of Search ..... 343/5 SA, 113, 117 A, 854, 343/100 SA; 324/77 B

[56] References Cited
UNITED STATES PATENTS

| 3,460,145 | 8/1969 | Johnson | 343/100 SA |
| 2,140,130 | 12/1938 | Earp | 343/117 A |
| 2,995,750 | 8/1961 | Holcomb et al. | 343/113 R |
| 3,327,309 | 6/1967 | Shulman et al. | 343/113 R |
| 3,657,693 | 4/1972 | Graham et al. | 343/113 R |

Primary Examiner—Maynard R. Wilbur
Assistant Examiner—Richard E. Berger
Attorney, Agent, or Firm—R. S. Sciascia; Charles D. B. Curry

[57] ABSTRACT

A phase-array antenna system which looks at all positions, rather than at one point, within its field of view, simultaneously. This is accomplished by modulating the incoming wave-front with a repetitive wide band signal in each antenna element. The system comprises a plurality of antennas, a plurality of modulators operatively connected to a modulation signal generator, a signal combiner device and a signal analyzer.

8 Claims, 4 Drawing Figures

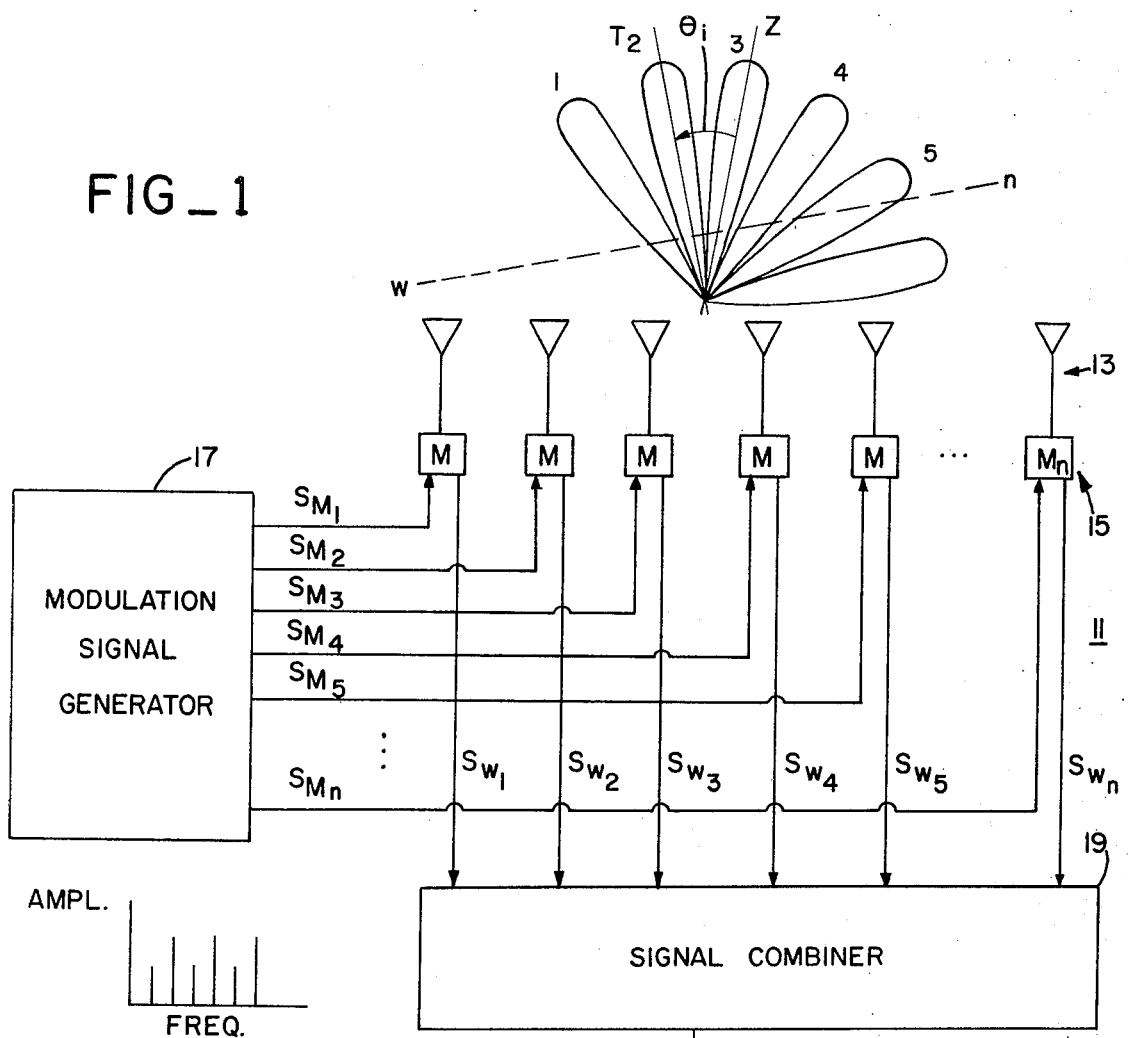
FIG_1
FIG_2
FIG_3
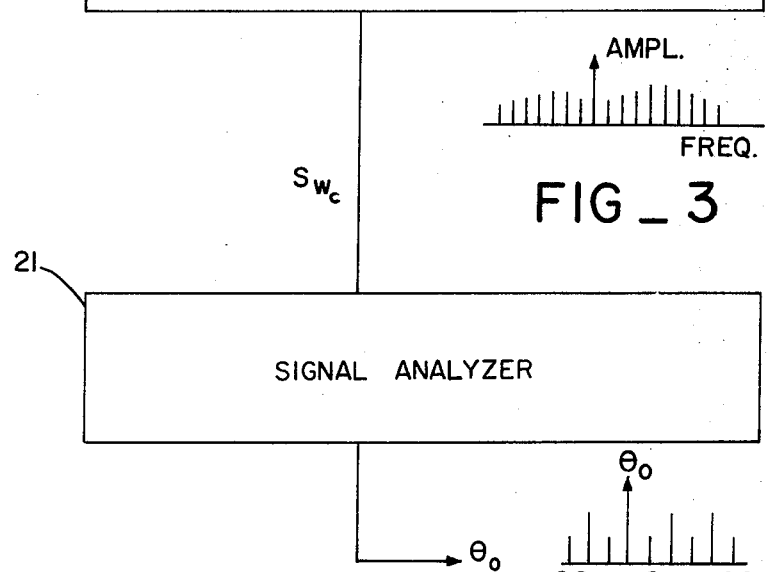
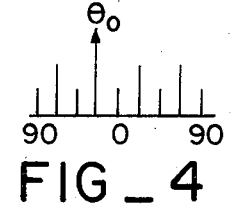
FIG_4

3,803,613

PHASE ANTENNA ARRAY PROVIDING CONTINUOUS ALL-ANGLE RECEPTION BY HARMONIC FREQUENCY MODULATION OF INCOMING SIGNALS

BACKGROUND OF THE INVENTION

1. Field of the Invention

The present invention relates to a phase-array antenna system which provides coverage at all positions, rather than one point, within its field of view simultaneously, and more particularly, a phase array antenna system which modulates the incoming wavefront with a repetitive wide band signal in each antenna element. The resulting modulated signals are then combined in a single wide band signal.

2. Description of the Prior Art

The conventional antennas use a narrow scanning beam to cover the same field of view. The optical analog for the aforementioned conventional antenna is a TV display wherein the picture is built up by many scanning lines over a certain time period. This system has a very narrow field of view as well as a slow time period since the angular information is displayed on a TV display.

SUMMARY OF THE INVENTION

The present invention overcomes the aforementioned problems in that the all-angle antenna is like a photograph; it resolution at all angles simultaneously and can gather angular information much faster than the TV display. A secondary advantage is that the direction, field of view and resiution can be rapidly varied by changing the modulating signal characteristics.

STATEMENT OF THE OBJECTS OF INVENTION

A primary object of the present invention is to provide a device which enables the antenna system to simultaneously cover a large field of view.

Another object of the present invention is to provide a device with a wide field of view and resolution which can be rapidly varied by changing the modulating signal characteristics.

Another object of the present invention is to provide a device which will produce a distinctive sideband pattern that can be identified in a signal analyzer.

Other objects and features will be apparent from the following description of the invention and from the accompanying drawings.

BRIEF DESCRIPTION OF THE DRAWINGS

FIG. 1 is a schematic drawing of the continuous all-angle antenna system;

FIG. 2 is a graphical representation of the wideband signals of the plurality of wideband signals $S_w$ from the modulation signal generator illustrated in FIG. 1;

FIG. 3 is a graphical representation of the combined modulated signal output from the signal combiner illustrated in FIG. 1; and FIG. 4 is a graphical representation of the combined modulated directional signal output from the signal analyzer illustrated in FIG. 1.

DESCRIPTION OF THE PREFERRED EMBODIMENT

Referring to FIG. 1, the continuous all-angle antenna system 11 comprises a plurality of modulators 15, a modulation signal generator 17, signal combiner 19, and a signal analyzer 21.

The plurality of phased-array antenna elements 13, which comprise the antenna array, are uniformally spaced and are of a standard configuration well known in the art. The incoming wavefront is received by each antenna element of the plurality of phased-array antenna elements 13. The incoming wavefront is modulated with repetitive wide bandwidth signals in each antenna element of the plurality of phased-array antenna elements 13. The resulting modulated signals are then combined in signal combiner 19 and result in a single or a small number of wide band signals, as illustrated in FIG. 3. The resulting spectrum has a large number of sidebands; the amplitude and phase relationship of these sidebands will depend on the modulating signal $S_M$ and upon the direction of arrival of the incoming wavefront. With a fixed modulating signal $S_M$, the amplitude and phase relationship of the sidebands will vary according to the direction of arrival of the incoming wavefront. Thus each angle will produce a distinctive sideband pattern that can be identified in the signal analyzer 21.

The plurality of modulators 15 may be of any general species which will respond to the particular output signals from the modulation signal generator 17. Moreover, the direction, field of view and resolution can be rapidly varied by changing the modulating signal characteristics. Each modulator of the plurality of modulators 15 is operatively connected to the output of one of the antenna elements of the plurality of antenna elements 13 which comprise the phased-array antenna.

The modulation signal generator 17 generates modulated output signals $S_{M_1}, S_{M_2}, S_{M_3}, S_{M_4}, S_{M_5}$ and ... $S_{M_n}$ 9. Each one of the modulated output signals of output signals $S_{M_1}, S_{M_2}, S_{M_3}, S_{M_4}, S_{M_5}$ and ... $S_{M_n}$ are applied as an input signal to one of the modulators of the plurality of modulators 15.

Each modulated signal $S_M$ generated from the modulation signal generator 17 is a wide bandwidth signal, as illustrated in FIG. 2. Each of the output signals $S_M$ of output signals $S_{M_1}, S_{M_2}, S_{M_3}, S_{M_4}, S_{M_5}$ and ... $S_{M_n}$ generated from modulation signal generator 17 may be varied in phase, frequency and amplitude depending on the characteristics that may be desired for any specific phase-array antenna operation.

The modulated signals $S_M$ generated from modulation signal generator 17 are each generated as a set of harmonics which are an integral multiple of the fundamental frequency of the other generated signals see FIG. 2. This harmonic relationship is true where the phase-shift $\phi_o$ is constant in each antenna element over the full frequency range of the antenna system. The modulated signals $S_{M_1}, S_{M_2}, S_{M_3}, S_{M_4}, S_{M_5} \ldots S_{M_n}$ generated from the modulation signal generator 17 are each generated as a set of harmonics which are an integral multiple of the fundamental frequency of each of the other modulated signals. This harmonic relationship is true where one signal has a different phase in its harmonics than the next signal. The set of harmonics for each one of the signals generated from the modulation signal generator 17 can be determined for operational purposes of the system by standard matrix methods well known in the art. For example, when $S_{M_1}$ is the fundamental frequency, then each of the other signals $S_{M_2}, S_{M_3}, S_{M_4}, S_{M_5}$ and ... $S_{M_n}$ are an integral multiple of the fundamental frequency. This example is a simplified special case of the general case described above. Moreover, each of the signals $S_{M_2}$, $S_{M_3}$, $S_{M_4}$, $S_{M_5}$ and ... $S_{M_n}$ are an integral multiple of each of the other. A harmonic oscillator, or other similar device with similar functional characteristics, may be used as the modulation signal generator.

Each of the modulators of the plurality of modulators 15 generates an output signal $S_w$. The output signals from the respective modulator of the plurality of modulators 15 are as follows: $S_{w_1}$, $S_{w_2}$, $S_{w_3}$, $S_{w_4}$ and ... $S_{w_n}$. The resulting output signals $S_{w_1}$, $S_{w_2}$, $S_{w_3}$, $S_{w_4}$ and ... $S_w$ from the respective modulators of the plurality of modulators 15 are a modulated version of the incoming wavefront signal from each antenna of the plurality of antennas 13 of the phased array antenna.

The signal combiner circuitry may consist of a bank of resistors operatively connected to the output of the respective modulators of the plurality of modulators 15. Each resistor would be operatively connected together to form a single common output which could be connected to the input of the signal analyzer 21. The resulting modulated signals $S_{w_1}$, $S_{w_2}$, $S_{w_3}$, $S_{w_4}$, $S_{w_5}$, and ... $S_{w_c}$ are combined in the signal combiner 19 which generates a single or a small number of wide band signals with a single spiked signal, as illustrated in FIG. 3. $S_{w_c}$ is the putput combined signal of the incoming signals $S_{w_1}$, $S_{w_2}$, $S_{w_3}$, $S_{w_4}$, $S_{w_5}$ and ... $S_{w_n}$ to the signal combiner 19. It should be noted that any signal combiner circuitry may be used to perform the signal combining function.

The combined signal $S_{w_c}$ is subsequently applied to the input of the signal analyzer 21 to determine the direction information signal $\theta_o$.

The signal analyzer 21 is a conventional spectrum analyzer. However, a filter bank with a threshold circuit may be used to provide a more precise target T directional information signal $\theta_o$. It should be noted that the invention does not reside in the combiner circuitry or any of the particular circuitry above, but resides in the basic apparatus combination.

A discussion of the operation of the continuous all-angle antenna system 11 follows: As illustrated in FIG. 1, the antenna array 13 is oriented in the Z direction and the incoming electromagnetic wavefront W is assumed for purposes of analysis of the operation of system 11 to be incident on 1 through $n$ number of beams with a target signal T located along the axis at beam 2 and having an angular relationship of $\theta_i$ from the Z direction the directional information signal $\theta_o$ is the output representation of the target location on target direction information signal $\theta_1$. When a fixed modulated signal is superimposed on the incoming wavefont at each antenna element, the amplitude and phase relationship of the sidebands will vary according to the direction of arrival of the incoming wavefront. Thus, each angle of each individual incoming wavefront will produce a distinctive sideband pattern that can be identified when combined into a single modulated wide band signal in a signal analyzer. The modulating signal superimposed on the incoming wavefront W forms a repetitive wide bandwidth antenna signal in each element. The target signal T will appear as a strong energy strobe on the signal analyzer scope, as illustrated in FIG. 4. The output of the signal analyzer 21 is an analog, or a digital signal, as the case may be. The direction information may be displayed on any suitable information display device.

The description, as stated above, is described in terms of a high frequency electromagnetic wave. The same unique modulation concept can be similarly applied to an acoustic or a sonar system as well as many optical systems.

What is claimed is:

1. A continuous all-angle phased-array antenna system comprising in combination:
   a. a plurality of means for sensing a directional incoming wavefront;
   b. a plurality of modulators each operatively connected on one of said wave sensing means;
   c. a modulation signal generator for generating a plurality of modulated signals each of said plurality of signals generated as a set of harmonics which are an integral multiple of the fundamental frequency of each of the other modulated signals operatively connected to the inputs of said plurality of modulators, each of said modulators generating a plurality of output signals which is an integral multiple of the fundamental frequency of each of the other output signals;
   e. a means for combining each of the output signals from each of said plurality of modulators operatively connected to the outputs of said plurality of modulators whereby each of the output signals from said plurality of modulators is combined in said signal combining means to produce a spiked target identifier signal; and
   f. a signal sensing analyzer operatively connected to the output of said signal combining means.

2. The device recited in claim 1 wherein said wave sensing means is an antenna with a plurality of antenna elements operatively connected to said plurality of modulators.

3. The device recited in claim 2 wherein each one of said antenna elements is connected to one of the modulators of said plurality of modulators.

4. The device recited in claim 3 wherein a separate modulation signal is generated to each one of said modulators of said plurality of modulators.

5. The device recited in claim 4 wherein an output signal is generated from each one of said modulators of said plurality of modulators wherein said output signal from each one of said modulators of said plurality of modulators is applied to the input of a signal output sensing means.

6. The device recited in claim 5 wherein said sensing means is a signal combiner operatively connected to said output of each one of said plurality of modulators wherein the resulting modulated signals from said modulators are combined in said signal combiner to form a resultant combined signal whereby the resultant combined signal is a modulated wideband signal.

7. The device recited in claim 6 wherein the resultant wideband signal is applied to an input of a signal analyzer.

8. The device recited in claim 7 wherein said signal analyzer is a spectrum analyzer which provides an output direction signal.

* * * * *